United States Patent Office 3,236,266
Patented Feb. 22, 1966

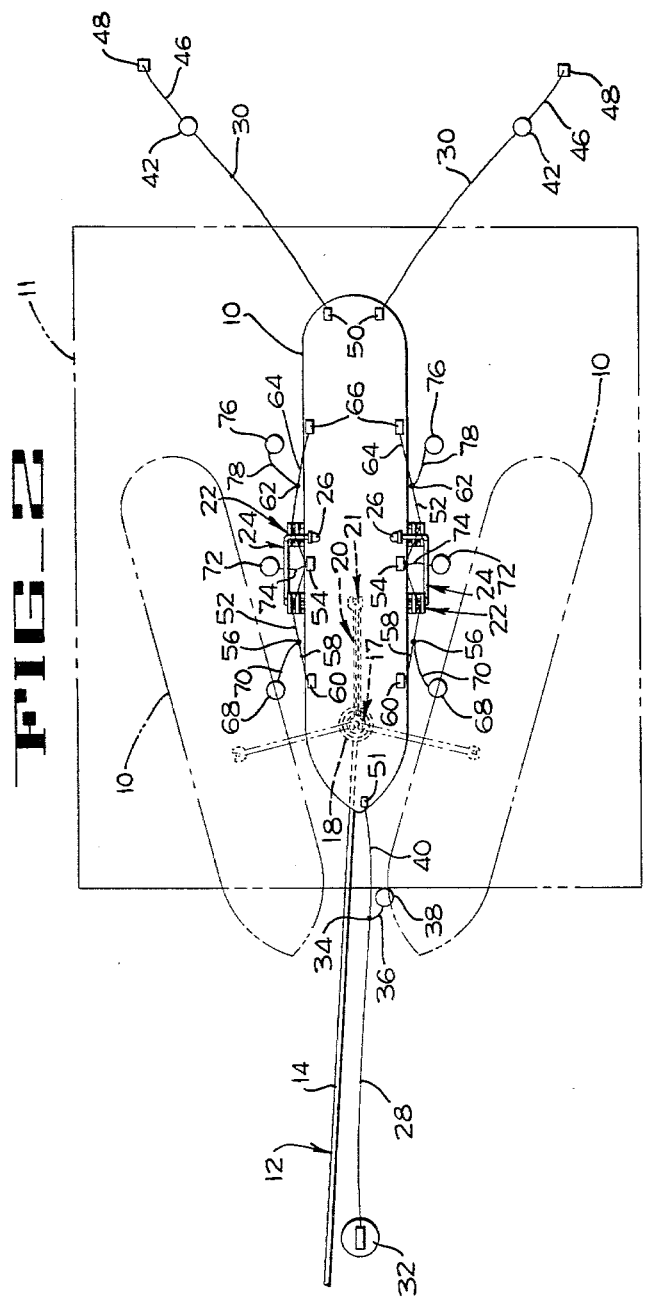

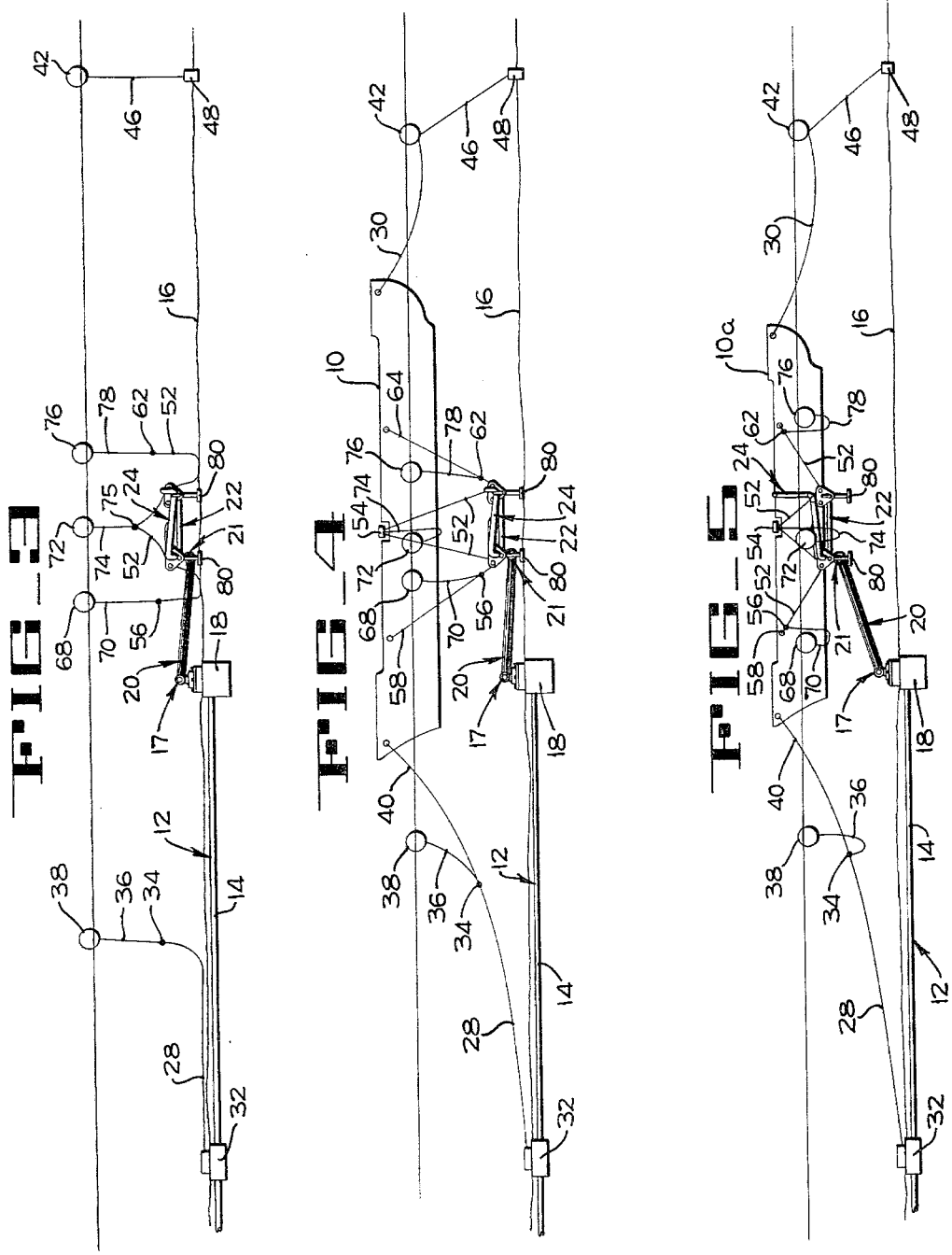

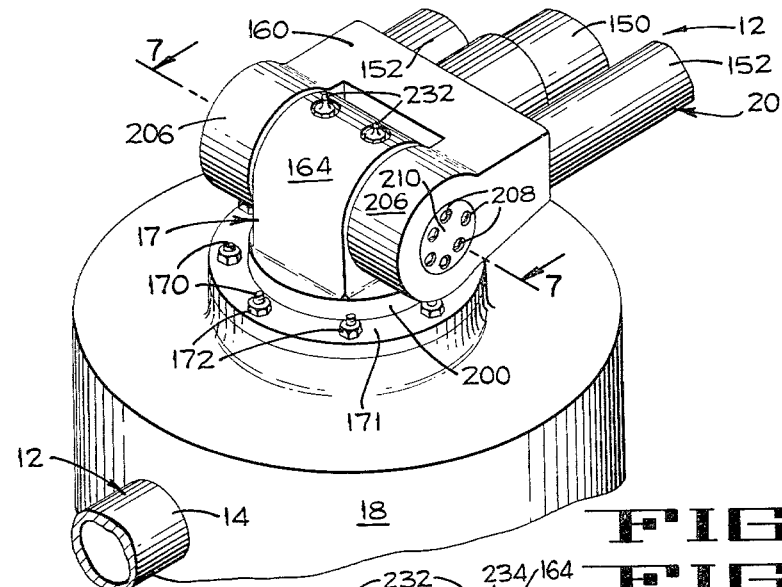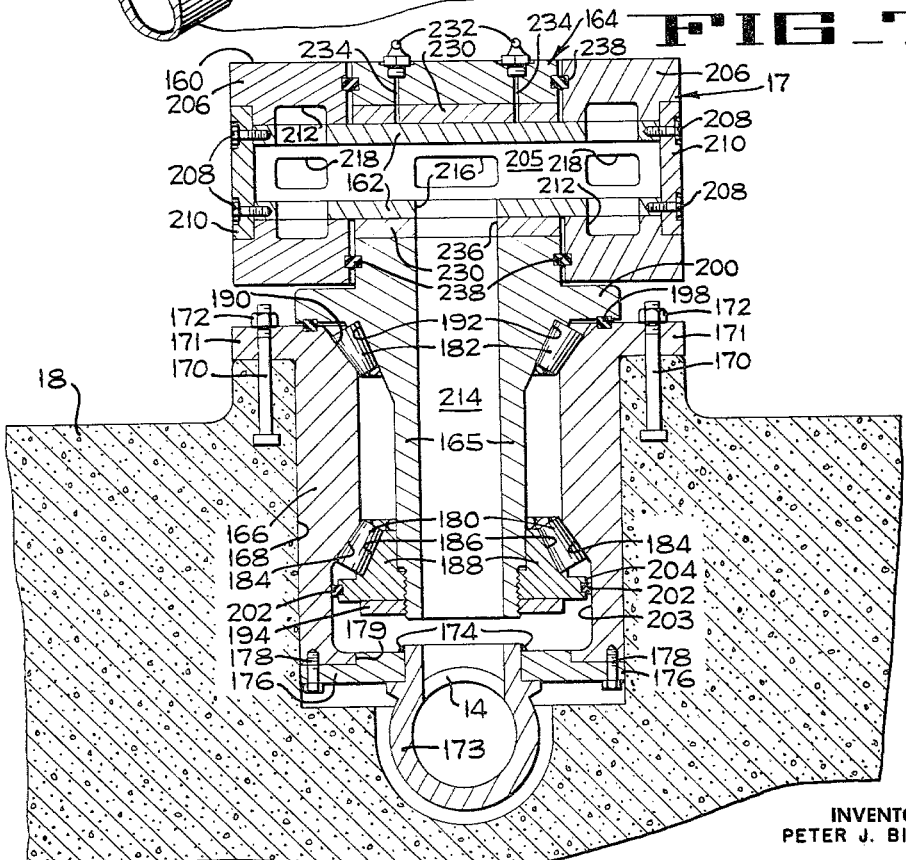

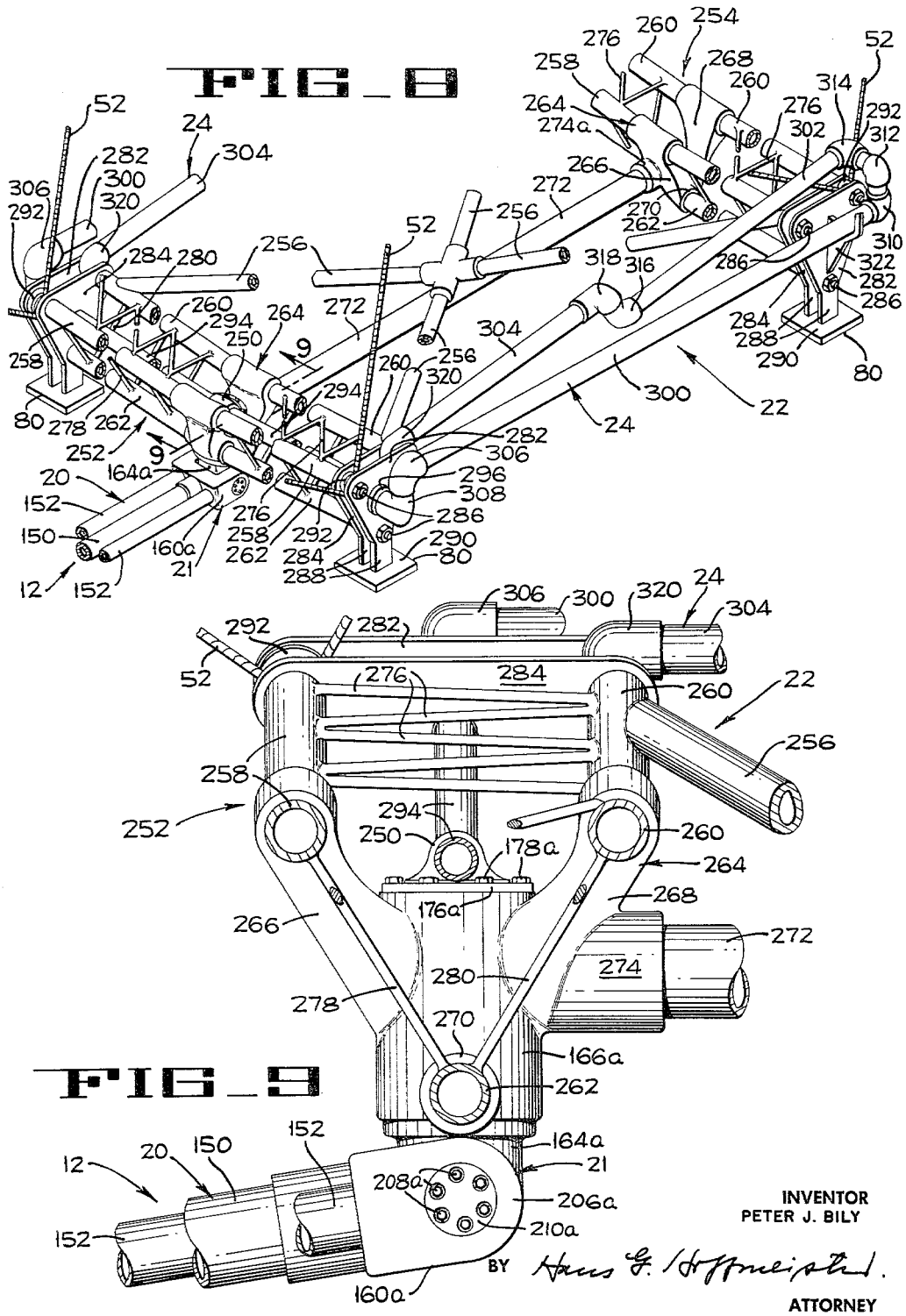

3,236,266
METHOD AND APPARATUS FOR TRANS-
FERRING FLUID OFFSHORE
Peter J. Bily, Sunset Beach, Calif., assignor to FMC
Corporation, San Jose, Calif., a corporation of Delaware
Filed Feb. 20, 1963, Ser. No. 259,846
29 Claims. (Cl. 141—1)

The present invention pertains to a method and apparatus whereby a marine tanker may be loaded or unloaded while standing offshore, and more particularly, this invention concerns offshore loading systems which employ submerged pipelines and that do not require permanent pipeline fittings at or above water level.

Many conventional systems of loading and unloading tankers anchored or otherwise moored offshore require the use of a buoy which serves as a pipeline terminal and is permanently anchored at the berthing site. Since the buoy is, in some degree, free to move relatively to the sea bed, a flexible hose connection is generally employed to connect the shore storage with the pipeline terminal on the buoy. However, as there is also considerable latitude for movement between the buoy and the ship, flexible hosing is again employed to connect the pipeline terminal with the ship. Severe demands are made on the flexible hosing used in such systems. Not only must the hoses be self-supporting over a considerable length, but they must withstand long periods of exposure to harsh weather conditions. In other known systems, some of the flexible hosing has been eliminated by forming a fixed pier-like structure at the berth which is permanently embedded in the sea bed and supports a platform for the pipeline terminal above the high water level. The disadvantage remains, however, since substantial lengths of flexible hosing must still be employed to connect the pipeline terminals on the platform with the tanker ship. Another considerable disadvantage of both the aforsaid systems lies in the fact that the buoy and platform are navigational hazards when not in use and are prone to accidental damage during the berthing of a ship. Furthermore, in areas subject to storms, the surface structures may be completely or partly demolished during bad weather. Finally, these known systems are particularly susceptible to tanker drift as the hosing cannot stand large tensile stresses.

An object of the present invention is therefore to provide a generally improved system whereby fluid may be loaded into or unloaded from ships berthed offshore.

Another object of this invention is to provide a method of offshore loading of a tanker which will allow for normal drifting and rise and fall movements of the ship without the need for flexible rubberized hosing.

Another object is to provide means for offshore loading and unloading of tankers that does not create a navigational hazard to shipping and is not subject to storm damage when not in use.

Another object of the present invention is to provide a system of loading and unloading fluid to and from ships at an offshore berth, which includes a pipeline having considerable tensile strength so that it may serve also as a mooring line.

Another object is to provide an offshore loading system which will permit a tanker to swing into alignment with the prevailing tide or wind while being loaded or unloaded.

It should be noted that, in this specification, the term "moored" is used to indicate that the tanker is anchored or is tied or secured to buoys, fixed anchor blocks or piles while berthed offshore. In this way, no distinction is drawn between anchoring and mooring. Also, it should be noted that the term "berth" is used to indicate the area or space normally occupied by a tanker when it is anchored or moored and while it is being loaded or unloaded by the systems described. The terms "bow-end" and "stern-end" will be used with respect to the berth as well as with respect to the ship since, in this specification, the ship will normally be oriented in a specific way at the berth when being connected or disconnected from the system of the invention.

Other objects, advantages and features of the present invention will be apparent from the following description of a particular form thereof made with reference to the accompanying drawings, in which:

FIGURE 1 is a diagrammatic elevation of a tanker being loaded or unloaded by a system formed in accordance with this invention.

FIGURE 2 is a diagrammatic plan of the tanker and system illustrated in FIGURE 1 and showing in addition, other positions which the tanker may assume during loading or unloading.

FIGURE 3 is an elevation similar to FIGURE 1, but shows the system when it is not in use.

FIGURE 4 is an elevation similar to FIGURE 1, but shows the system when it is just about to be used.

FIGURE 5 is an elevation similar to FIGURE 1 but shows a smaller tanker being loaded or unloaded.

FIGURE 6 is a perspective from above of the lower swivel joint employed in the system illustrated in FIGURES 1 and 2.

FIGURE 7 is a section taken along section plane 7—7 indicated in FIGURE 6.

FIGURE 8 is a fragmentary perspective from above of the pallet structure employed in the system illustrated in FIGURES 1 and 2.

FIGURE 9 is a section taken along the section plane 9—9 indicated in FIGURE 8.

Referring particularly to FIGURES 1 and 2 of the accompanying drawings, a tanker ship 10 is shown at a berthing area 11 (indicated by phantom lines in FIG. 2) while discharging or loading fluid, for example oil, to or from the shore (not shown) through a single pipeline assembly 12. The pipeline assembly 12 may be considered as being formed in three interconnected sections: the first section 14 being connected to a storage facility (not shown) on shore extending along the sea bed 16 to a swivel joint 17 housed in an anchor the sea bed 16 to a swivel joint 17 housed in an anchor block 18, the second section 20 extending from the swivel joint 17 to a similar joint 21 formed on the forward end of a pallet structure 22, and the third section consisting of two tubular loading arms 24 which extend from joint 21 to the sides of the pallet structure 22 and up the sides of the tanker 10. Section 14 of the pipeline assembly 12 may be buried under the sea bed 16, as shown in FIG. 1, to reduce the likelihood of mechanical damage but, if such damage is unlikely, it may simply be laid on the sea bed. Section 20, however, must be free to move from a normal or inoperative position (FIG. 3) to its operative position (FIG. 1) as well as being free to swing around the vertical axis of anchor block 18. Each swivel joint 17 and 21 permits movement about a horizontal as well as a vertical axis. Each loading arm 24 is swivel-jointed and permanently secured to the corresponding side of the pallet 22 and is arranged so that it may be raised from the pallet (FIG. 1) and connected over the corresponding side of the ship to a pipeline terminal fitting 26 (FIG. 2) which is in fluid conductive communication with a storage tank (not shown) on the ship. The details of the pallet structure 22 and the manner in which it is raised into place will be subsequently described, together with the details of the anchor block 18.

Although FIGURES 1 and 2 show the tanker 10 being moored by a single bow line 28 and two stern lines 30, these mooring lines need be employed only when the tanker is being attached to or detached from the pallet structure 22. During actual loading and unloading of the tanker, the mooring lines 28 and 30 may be cast off so that the tanker is free to range about the anchor block 18. Alternatively, once the pallet 22 has been connected to the tanker, the mooring lines 28 and 30 may be slackened off to permit the tanker to range over a comparatively limited area during loading and unloading operations as indicated in phantom lines in FIG. 2. Bow line 28 is permanently secured at one end to an independent anchor block 32 and its free end is attached by a shackle 34 to a buoy line 36 which is, in turn, secured to a bow marker buoy 38. The bow marker buoy 38 and its line 36 are employed to retrieve the shackle 34 and the free end of line 28 when the tanker 10 is about to be moored at its berth 11 so that a ship's bow line 40 may be secured to the shackle 34. On the other hand, each stern line 30 is, in fact, a ship's line and is secured to a corresponding stern marker buoy 42, each buoy 42 being connected by buoy line 46 to a corresponding anchor block 48 embedded in the sea bed 16 (FIGS. 1 and 2). Finally, each of the stern lines 30 is hauled in or payed out by a corresponding shipboard stern winch 50, while the ship's bow line 40 is handled by means of a bow winch 51 (FIG. 2).

As best seen in FIG. 1, while the system is in use, the pallet structure 22 is held in a raised position in firm contact with the hull of the tanker 10 by means of a pallet cable 52 on each side of the pallet. When the pallet structure 22 is in the raised position, the center of each pallet cable 52 is secured to a deck bollard 54, the forward end of each is coupled by a shackle 56 to a corresponding ship's forward side cable 58 attached to a forward side winch 60 (FIG. 2), and the aft end of each pallet cable 52 is coupled by shackle 62 to a ship's aft side line 64 which is secured to an after side winch 66. Pallet marker buoys are connected to each pallet cable 52 so that the pallet cables may be retrieved without difficulty once they have been cast off from the ship. The pallet marker buoys therefore comprise (on each side of the ship) a forward buoy 68 joind by its cable 70 to the shackle 56, a center buoy 72 linked by cable 74 to a shackle 75 (FIG. 3) in the center of the pallet cable 52, and an aft marker buoy 76 linked by cable 78 to the shackle 62 at the aft end of the corresponding pallet cable 52.

FIG. 3 shows the system when it is not in use and it will be noted that the only portions thereof which are not submerged are the various marker buoys, namely: buoy 38, forward pallet buoys 68, central pallet buoys 72, after pallet buoys 76, and stern marker buoys 42. Since the pallet structure 22 is heavier than water, it will sink to the sea bed 16 and rest thereon by means of four feet 80 provided thereon. Also, it will be noted that the loading arms 24 are folded back on themselves and rested on the corresponding pallet side. FIGURE 4, on the other hand, shows the tanker 10 in place at the berth between the two rows of pallet buoys and connected to the bow and stern marker buoys, the ship's side lines 58 and 64 having been connected to the corresponding shackles 56 and 62, and the center of the pallet cable 52 on each side of the tanker having been drawn upwardly and secured to the bollard 54 by another ship's line (not shown).

In berthing, the tanker 10 is steered between the stern buoys 42 toward the bow buoy 38 so as to pass between the two rows of pallet marker buoys 68, 72 and 76. The ship's bow cable 40 is then payed out and connected to the shackle 34 of the bow buoy cable 36. At the same time, the ship's stern cables 30 are payed out and connected to the stern buoys 42 so that little tanker drift will occur while the pallet connections are being made. Then, by hauling in pallet buoy cables 70, 74 and 78 the ship's fore and aft side cables 58 and 64 on each side of the ship are connected to corresponding shackles 56 and 62 while another ship's cable (not illustrated) is connected to shackle 75 which connects buoy line 74 to the pallet cable 52, the latter ship's cable being hauled in after connection while the ship's cables 58 and 64 are simultaneously payed out.

As will be subsequently more clear, each pallet cable 52 is passed about the corners of the corresponding side of the pallet structure 22 in such a manner that it may slide with respect to the pallet to equalize the load on the various sections thereof. However, when the center pallet cable shackle 75 has been raised to deck level and passed about the bollard 54 so that the weight of the pallet structure 22 may be partially supported thereby, the side ship's cables 58 and 64 are hauled in to raise the pallet into firm abutment with the ship's hull.

When the pallet structure 22 has been made fast on the ship's hull the loading arm assembly 24 on each side of the pallet is raised by means of ship's tackle and connected to the shipboard pipeline connections 26 as previously described. However, the distance from the pallet structure 22 to the deck of a tanker will depend upon the size of a tanker and the loading arm assembly 24 must be able to accommodate such differences. The tanker ship 10 shown in FIGURES 1, 2 and 4 is comparatively large and the lower section of the loading arm 24 must reach up at a substantial angle, while tanker 10a of FIGURE 5 is smaller permitting the lower section of the loading arm 24 to remain almost horizontal.

Once the loading or unloading operations have been completed, the tanker may simply be disconnected from the pipeline assembly by reversing the connection procedures. Thus, the loading arms 24 will be disconnected from the shipboard connections 26 and lowered by ship's tackle into position on the pallet structure 22. Then, the sidelines will be loosened and payed out to lower the pallet structure to the sea bed, whereupon, the pallet lines 52 will be cast off at all points; however, it should be noted that the normal and most desirable procedure is to first secure the bow and stern lines to the respective marker buoys, if these lines have been cast off, or to draw in these lines if they have been slackened off so that the tanker will be positioned identically at the start and the finish of the loading operations. The pallet structure will therefore be returned to the same spot as it was raised from and the connection of the next tanker to use the berth to the pipeline will be facilitated.

Although the principle and operation of the system of this invention have been described with respect to FIGURES 1–5 of the accompanying drawings, the details of the pivotal pipeline joints 17 and 21, and the details of the pallet structure 22 will now be described with reference to FIGURES 6–9 of the drawings.

It will be evident from the foregoing description that a substantial proportion, if not all, of the force necessary to keep the tanker 10 at its berth is borne by the section 20 of the pipeline assembly 12 which extends from the anchor block swivel joint 17 to the pallet swivel joint 21. Pipeline section 20 therefore consists of a central force transmitting tube 150 and two oil pipes 152 arranged one on either side of the central tube 150. The tube 150 is considerably larger in diameter than the pipes 152 and is sealed so as to form a buoyancy chamber which will reduce the dead weight of the pipeline section and of the pallet structure 22. The lower end of the pipeline section 20 (see FIGURES 6 and 7) which is connected to the anchor block 18 terminates in a heavy bifurcated yoke 160 which, in turn, is secured by means of a hollow pin 162 to a rotatable pedestal 164 mounted within and projecting from a hollow cylindrical housing 166; the yoke 160, pin 162, pedestal 164, and housing 166 being parts of the swivel joint 17. The housing itself is located within a cylindrical recess 168 formed in the concrete anchor block 18 and is firmly secured therein by means of studs 170 set into the anchor block. The studs 170 project from the upper surface of the anchor block 18 through appropriate holes formed in a head flange 171 of the housing 166, nuts 172 being employed to clamp the flange 171 firmly against the anchor block 18. The pipeline section 14 from the shore enters anchor block 18 at one side thereof and terminates in the upwardly extending end of an elbow 173 which is secured, as by the welding runs 174, to a bottom cover plate 176. Cover plate 176 is detachably secured to the housing 166 by bolts 178 and covers the access aperture 179 in the bottom of the housing as well as furnishing the fluid connection between the pipe 14 and the tubular housing 166.

With particular reference to FIGURE 7, the pedestal 164 has a hollow cylindrical foot portion 165 rotatably and concentrically housed within the fixed housing 166 by a lower and an upper set of tapered roller bearings 180 and 182, respectively. The lower set of rollers 180 is located between appropriate upwardly and inwardly inclined frustro-conical bearing surfaces 184 and 186 formed on the lower interior wall of the housing 166 and on the exterior of a preload ring 188, respectively. On the other hand, the upper set of rollers 182 is located between appropriate downwardly and inwardly inclined frustro-conical bearing surfaces 190 and 192 formed on the upper interior portion of the housing 166 and on the upper exterior of the pedestal foot 165, respectively. It will be noted that the preload ring 188 is screw-threaded on the lower extremity of the pedestal foot 165 so that the two sets of rollers may be preloaded, and a lock-nut 194 is also threaded onto the pedestal foot beneath the preload ring 188 to lock the latter in position after the desired preload has been set.

Ingress of water into the bearings 180 and 182 is prevented by an annular seal or packing ring 198 disposed between an external radial flange 200 on the pedestal 164 and the upper face of head flange 171 of the housing 166. Similarly, dilution of grease employed to pack the bearings is prevented by a seal or packing ring 202 arranged between the lower inner cylindrical surface 203 of the pedestal housing 166 and external cylindrical surface 204 of the preload ring 188.

As previously indicated, the bifurcated yoke 160 is pivotally secured to the upper portion of the pedestal 164 by a horizontal pivot pin 162 housed transversely in the top of the pedestal. The pin 162 is hollow, having a central bore 205, and is firmly located in each arm 206 of the yoke 160 by end bolts 208 and an end cover plate 210. Each arm 206 of the yoke 160 is also hollow, having a passage 212 formed therein which extends from the pin 162 to communicate with the fluid pipe 152 associated with that arm. Communication between the pipeline 14 and each fluid conducting pipe 152 is therefore established in the following manner: the elbow 173 communicates with the interior of housing 166 and therefore with bore 214 of the pedestal 164; the pedestal bore connects with bore 205 of pin 162 by means of central apertures 216 formed in the pin; and, by similar end apertures 218, formed in each end of the pin, the pin bore 205 connects with yoke passages 212 which extend from the end pipes 152. Thus, even though the pin 162 may rotate within the pedestal 164 (with the limited movement of the yoke 160 when the pallet is raised from the sea bed to the tanker hull), the flow passage between the pipeline 14 and the pipes 152 is not restricted.

A bearing liner 230 is pressed into the pedestal to provide a suitable bearing surface for the pin 162, and the interface between the bearing liner 230 and the pin 162 is lubricated through grease nipples 232 and grease passages 234, a suitable aperture 236 being formed in the bearing liner 230 to provide a passage between the pedestal bore 214 and the pin bore aperture 216. A packing ring 238 is fitted between the inner face of each yoke arm 206 and the opposing outer face of the pedestal 164 to exclude water from the space between these surfaces and from the pin bearing.

Referring now to FIGURES 8 and 9 of the accompanying drawings which illustrate the pallet structure 22, it should be first noted that the upper swivel joint assembly 21 by which the pipeline section 20 is fixed to the pallet structure 22 is practically identical with the lower swivel joint assembly 17 and therefore will not be described in detail. However, where the external features of the swivel joint 21 are referred to, the same reference numerals as employed for swivel joint 17 will be used with the suffix "a" applied to each.

Swivel joint 21 consists basically of a heavy bifurcated yoke 160a pivotally secured to a rotatable pedestal 164a which is axially located in a tubular housing 166a. As in the swivel joint 17, each arm 206a of yoke 160a is secured to a transverse pin which is rotatably secured within one end of the pedestal 164a by means of end plates 210a and end bolts 208a. A cover plate 176a having a pipe fitting permanently attached thereto is secured to the other end of the housing 166a by bolts 178a. However, in place of the elbow 173 in swivel joint 17, a T-piece fitting 250 is attached to the cover plate 176a.

The pallet structure 22 is fabricated by welding from tubular steel components, each component being sealed to exclude water and thereby increase buoyancy of the whole assembly. The structure basically consists of two identical transom assemblies, a forward transom 252 and an aft transom 254 joined together by cross-bracing 256. As each transom is substantially identical with other (except for the incorporation of the swivel joint housing 166a in the forward transom structure 252), only the forward one has been fully illustrated and will be described and the same reference numerals will be assigned to corresponding parts of both.

The forward transom structure 252 may be considered as being formed by three parallel and transversely extending main tubular members; a forward member 258, an aft member 260, and a lower central member 262. Each of these main members is actually formed in two parts which lie in the same vertical plane but are angled upward and outward with respect to each other from the horizontal plane at an angle set by sockets formed in a saddle structure 264 in the center of the transom. Because of the inclusion of the housing 166a in the forward transom 252, the saddle structure 264 of this transom is somewhat different than that of the aft transom 254. However, each saddle may be regarded as a V-shaped member having a forward upwardly extending arm 266 and an aft upwardly extending arm 268 which rise from a lower central boss 270, the upper end of arm 266 comprising the sockets that receive the two halves of main member 258, the upper end of arm 268 comprising the sockets that receive the two halves of main member 260, and the boss 270 forming the sockets that receive the two halves of the lower member 262.

In addition to the previously mentioned cross-bracing 256, the forward and aft transoms are secured together by means of a heavy longitudinally extending main tubular member 272, the forward end of which member is fixed within a rearwardly extending boss 274 on the aft arm 268 of the forward transom saddle 264 and the aft end of which is fixed in a similar socket 274a on the forward arm 266 of the aft transom saddle 264.

In each transom 252, 254, each main member 258, 260 and 262 is positively positioned and secured with respect to its fellow members by the associated central saddle 264; by bracing runs 276, 278 and 280 which respectively connect main members 258 and 260, 258 and 262, and 260 and 262 together along their lengths; and by a pair of triangular end plates 282 and 284 at each end of the transom structure. The innermost end plate 284 of each pair is welded at its corners to the outer ends of the main transom members and thereby secures these members firmly together. On the other hand, the outer plate 282 of each pair of end plates is arranged parallel to the inner plate 284 but is spaced outwardly therefrom by three studs 286 and is secured in this spaced position by means of nuts which engage the outer end of these studs. Referring to FIGURE 8, it will be noted that the lower corner of each end plate is elongated to form an extension 288 which projects downwardly for a considerable distance from the end and is welded at its lower extremity to a sole plate 290. The sole plate 290 and the extensions 288 associated with each pair of end plates together comprise one of the feet 80 previously referred to.

As already described, the pallet structure 22 is raised from the sea bed into contact with the tanker hull by means of the pallet cables 52 which are slidingly passed beneath each corner of the pallet structure. For this purpose, therefore, a sheave 292 is rotatably mounted between each pair of triangular end plates 282 and 284 on each transom assembly 252 and 254 by that stud 286 which is in line with the outermost transom member 258 of the forward assembly and member 260 of the aft assembly. Thus, as clearly shown in FIGURES 8 and 9, each pallet cable 52 is passed beneath the two sheaves 292 on the corresponding side of the pallet structure 22 and enables the structure to be raised into position in the manner previously described.

FIGURE 8 also illustrates the loading arms 24 in greater detail, and it will be noted that each arm is fixed to the outer end plate 282 on the corresponding side of the forward transom 252 and each is connected by a branch pipe 294 to the T-fitting 250 on the cover plate 176a of swivel joint 21. In this way, therefore, the oil conveying pipes 152 of the pipeline section 20 are connected in fluid conductive relation with both of the loading arms 24. Each branch pipe 294 passes outwardly from the cover plate 176a through the corresponding pair of end plates 282 and 284 to terminate in a swivel joint 296 that permits the entire corresponding loading arm 24 to swing as a whole about the axis of that branch pipe.

Each loading arm 24 basically comprises a relatively long lower pipe member 300, a shorter intermediate member 302, and an upper member 304 whose length is approximately equal to the difference in the lengths of the lower and intermediate members 300 and 302, respectively. An elbow 306 is welded to the lower end of lower member 300 and is swively connected to another elbow 308 which, in turn, is swively connected to the corresponding branch pipe 294 by the aforementioned swivel joint 296. Similarly, the upper end of member 300 has an elbow 310 welded thereto which is swively connected to an elbow fitting 312 that is also swively connected to an elbow 314 welded to the lower end of intermediate member 302. An elbow 316 is welded to the upper end of intermediate member 302 and is swively connected to another elbow 318 welded to the lower end of the upper member 304. Finally, a terminal fitting 320 caps the free end of each loading arm 24 so that, when it is not in use, the loading arm is sealed against entry of water and, when it is in use, the loading arm may be connected to the corresponding shipboard fittings 26.

When either loading arm 24 is not in use, it is folded back on itself and rested in a hook-like bracket 322 welded to the outer end plate 282 on the corresponding side of the aft transom structure 254. In the folded state the terminal fitting 320 of each loading arm 24 is hooked over the stud 286 that is in line with main forward transom member 260 on the corresponding side of the structure. As above indicated, when the loading arms 24 are in use (FIGS. 1, 4 and 5) they extend upwardly to the deck of the tanker, the lower and intermediate pipe members 300 and 302 providing adjustment for various sizes of tanker (both in beam and in height dimensions), while the upper pipe member 304 passes inboard over the deck to enable the loading arm to be connected conveniently to the tanker pipeline terminals 26 (FIG. 2).

It will be seen from the above described example of the application of the principles of this invention that an offshore tanker loading system has been developed which, when not in use, does not constitute a navigational hazard, is not subject to accidental damage and is not liable to storm damage. Furthermore, this system allows the tanker to range at will, or at least sufficiently to accommodate the winds and tide, without the use of flexible hosing. Finally, the tanker is moored entirely, or at least partially, by the movable pipe line section and, since such mooring involves the fixing of one end of the pipeline to the ship, problems of flexible couplings and pipes between the ship and the storage are overcome.

While a particular embodiment of the present invention has been shown and described it will be understood that this particular offshore tanker loading system is capable of modification and variation without departing from the principles of the invention, and the scope of the invention should be limited only by the scope and proper interpretation of the claims appended hereto.

The invention having thus been described, that which is believed to be new and for which protection by Letters Patent is desired is:

1. A method of establishing fluid conductive communication with a ship at an off-shore berth, said method comprising the steps of raising one end of a submerged fluid pipeline which is pivotally secured at its other end to the sea bed, securing said raised end of the pipeline firmly and pivotally to a ship at the berth so that the pipeline moves with the normal movements of the ship at the berth and so that the pipeline moors the ship in said berth, and connecting said one end of the pipeline to a fluid conductive fitting on the ship.

2. A method of establishing connections for the loading or unloading of a tanker ship while it is moored at an offshore berth, said method comprising the steps of: raising a rigid end section of a submerged fluid conductive pipeline from a position on the sea bed at the berthing area by pivotally moving said end section with respect to the sea bed and the remainder of the pipeline, detachably securing the raised section of said pipeline to the ship for relative pivotal movement between the pipeline and the ship about both horizontal and vertical axes so that the ship is moored by said end section but is free to range to a limited extent at the berth, and connecting said raised end of the pipeline to a fluid conductive fitting on the ship.

3. A method of establishing connections for conducting fluid between a shore installation and a tanker ship moored at an offshore berthing area, said method comprising the steps of: raising a submerged pallet structure, which is attached to one end of a submerged pipeline section, in pivotal movement about an axis at the other end of said pipeline section and adjacent the sea bed, said pipeline section being in fluid conductive relationship with the shore installation; detachably and firmly securing the raised pallet structure to the ship so that the pallet structure moves conjointly with the ship at the berth; and connecting said one end of the pipeline to a fluid conductive fitting on the ship.

4. A method of establishing connections for the loading or unloading of a tanker ship while it is moored at an offshore berthing area, said method comprising the steps of: raising a pallet structure from a normal position on the sea bed at the berthing area, by pivotally moving said pallet with respect to one end of a submerged pipeline section and by pivotally moving said pipeline section and said pallet about two mutually perpendicular axes with respect to the sea bed, to an operational position in firm contact with the ship, the other end of said pipeline section being anchored to the sea bed and being in fluid conductive connection with a fluid supply pipeline; and connecting a fluid conductive fitting on the ship to said one end of the pipeline section at the pallet, while the pallet is in the operational position.

5. A method of establishing connections for the off-shore loading or unloading of a tanker ship, said method comprising the steps of: pivotally moving a submerged pallet structure with respect to one end of a pipeline section and pivotally moving the other end of said pipeline section with respect to an anchor block on the sea bed to raise said pallet structure into contact with the hull of said ship; securing the pallet structure firmly to said hull to moor the ship to said anchor block by means of said pipeline section; and connecting a fluid conductive fitting on the ship to said one end of the pipeline section at the pallet, the other end of the pipeline section being in fluid conductive connection at the anchor block with a submerged, fixed fluid supply pipeline.

6. A method of establishing connections for the loading and unloading of a tanker ship at an off-shore berth, said method comprising the steps of: arranging a rigid pipeline section on the sea bed at said berth to extend from a pallet structure at one end of said section to an anchor block at the other end thereof, the pipeline section being pivotally connected to the pallet structure for movement relative thereto about a horizontal and vertical axis and also being pivotally connected to the anchor block for relative movement with respect thereto about a vertical and a horizontal axis; connecting said other end of the pipeline section at the anchor block in fluid conveying relationship with a shore storage; raising the pallet structure from the sea bed to a position against the hull of the ship at said berth by pivotally moving said pallet with respect to said section and said section with respect to said anchor block; securing the pallet structure to the ship so that it moves conjointly therewith during normal movements thereof at the berth and so that the ship is moored by said pipeline section; and connecting said one end of the pipeline section at the pallet structure in fluid conductive relation with a fitting on the tanker ship.

7. A method of establishing fluid conductive connections for the loading or unloading of a tanker ship at an off-shore berth, said method including the steps of: maneuvering the tanker ship over a submerged pallet structure disposed at said off-shore berth; raising said pallet while pivotally moving it relative to a submerged pipeline section attached thereto at one end and while pivotally moving said section relative to an anchor block on the sea bed to which the other end of said pipeline section is attached; securing said pallet firmly to the hull of the tanker ship so that it will move conjointly with the ship during the drifting movement of the ship at the berth and so that said pipeline section will bear at least the portion of the mooring forces necessary to maintain the tanker ship at its berth during loading or unloading operations; and, when the pallet has been so connected, raising a swivel-jointed fluid conductive loading arm from the pallet structure and connecting one end thereof in fluid conductive relationship with a fitting on the tanker ship, the other end of said fluid conductive loading arm being permanently connected in fluid conductive relationship with said one end of the pipeline section at the pallet, and the other end of the pipeline section being permanently connected at the anchor block to a submerged, fixed fluid supply pipeline.

8. A method for the off-shore loading or unloading of a tanker ship comprising the steps of: mooring the tanker ship at an off-shore berth so that it is positioned directly over a submerged pallet structure which normally rests on the sea bed; raising the pallet structure from the sea bed and drawing it into firm contact with the bottom of the ship's hull; raising a swivel jointed fluid conductive loading arm from the pallet structure and connecting said loading arm in fluid conductive relationship with the tanker ship; and loosening the tanker moorings so as to permit normal drifting of the tanker at the berth, the fluid conductive loading arm being connected in fluid conductive relationship with one end of a rigid pipeline section which is pivotally secured to the pallet structure for movement with respect thereto about vertical and horizontal axes, the other end of the pipeline section being anchored to the sea bed for pivotal movement with respect thereto about vertical and horizontal axes and being arranged in fluid conductive relationship with a shore storage facility, the drifting of the tanker ship at the berth thereby being limited at least partially by said pipeline section which thereby bears at least a portion of the mooring forces required to limit the movement of the tanker ship at the berth.

9. A system for establishing a fluid conductive connection with a ship moored at an off-shore berth, said system comprising a normally submerged fluid pipeline section pivotally anchored at one end to the sea bed, a pallet pivotally attached to the other end of said pipeline section, means for raising the pipeline section and pallet from the sea bed and for drawing the pallet against the hull of the ship at the berth, and fluid conductive means on the pallet for connecting said other end of the pipeline section to said ship.

10. A system for establishing a fluid conductive connection with a ship's pipe fittings while the ship is at an off-shore berth, said system comprising: a submerged pipeline having one end thereof arranged on the sea bed adjacent the berth, an anchor block anchoring said one end of said pipeline to the sea bed, a movable pipeline section arranged in fluid conductive relation with the one end of the submerged pipeline and pivotally anchored by one end to said anchor block, a submerged pallet structure pivotally attached to the other end of said pipeline section, means associated with said pallet structure for drawing it into contact with a ship at the berth, and fluid conductive means associated with said pallet structure for connecting said other end of the pipeline section to the ship's fittings when the pallet has been drawn into contact with the ship, limited relative movement between the ship and the sea bed while said connection is established thereby being accommodated by pivotal movement of the pallet with respect to the pipeline section and of the pipeline section with respect to the anchor block.

11. A system for establishing a fluid conductive connection between the ship-board pipe fittings of a ship moored at an off-shore berth and a shore storage, said system comprising: a submerged fixed pipeline section having one end arranged adjacent the berth and having the other end connected in fluid conductive relationship with the shore storage; an anchor block anchoring said one end of said fixed section to the sea bed; a submerged movable pipeline section arranged in fluid conductive relation with the one end of the fixed section and pivotally anchored by one end to the anchor block for movement with respect thereto about vertical and horizontal axes, said vertical axis being fixed relative to the sea bed; a submerged pallet structure pivotally attached to the other end of said movable section for movement with respect thereto about vertical and horizontal axes; means associated with said pallet structure for drawing it upwardly into contact with the hull of the ship at said berth; and a fluid conductive loading arm mounted on said pallet structure and having one end thereof in permanent fluid conductive connection with said other end of the movable section, the other end of said arm being adapted to be raised from conductive connection between the other end of said movable pallet structure and connected with said ship-board pipe fittings when the pallet structure is drawn into contact with the ship's hull; the normal vertical movements of the ship at the berth relative to the sea bed being accommodated by pivotal movement of the movable section with respect to the anchor block and with respect to the pallet structure about said horizontal axes, said ship being restricted by the movable section to range in a limited area about the anchor block while the pallet structure is held in contact with the ship, said ranging being accommodated by the relative pivotal movement between the movable section and the anchor block and between the movable section and the pallet structure about said vertical axes.

12. A system whereby a tanker may be loaded or unloaded at an offshore berth while permitting limited drifting and normal up and down motions of the tanker at its moorings at said berth, said system comprising; a submerged fixed pipeline section having one end arranged at the berth and the other end connected in fluid conductive relationship with a shore storage facility; an anchor block anchoring said one end of said fixed section to the sea bed; a first fluid conductive swivel joint, permitting pivotal movement about horizontal and vertical axes, and connected in fluid conductive relation with the one end of the fixed section and anchored by said anchor block to the sea bed; a submerged movable pipeline section having one end fixed in fluid conductive relation with said first swivel joint for movement about said axes; a second fluid conductive swivel joint, permitting pivotal movement about horizontal and vertical axes, and attached in fluid conductive relation to the other end of said movable section; a submerged pallet structure attached by said second swivel joint to the movable section so as to permit relative movement of the pallet and movable section about the last mentioned axes; cables attached to said pallet structure and secured to buoys at the berth whereby the pallet structure may be drawn into firm contact with the hull of a ship at the berth; and a fluid conductive, swivel jointed loading arm having one end in fluid conductive connection with the second swivel joint and fixed to said pallet and the other end raisable from the pallet structure for fluid conductive connection with fittings on said ship.

13. A system of establishing connections for loading and unloading a tanker ship at an offshore berth, said system comprising: a pipeline having one end thereof arranged on the sea bed adjacent the berth; an anchor block anchoring said one end of said pipeline to the sea bed; a submerged and rigid movable pipeline section arranged in fluid conductive relation with the one end of the pipeline and pivotally anchored by one end to said anchor block; a submerged pallet structure normally resting on the sea bed at the berth and pivotally attached to the other end of said pipeline section; cable means permanently attached to said pallet structure and secured to buoys at the berth for raising said pallet structure from the sea bed and for drawing it into firm contact with the bottom of the ship's hull, said movable pipeline section thereby serving to moor the ship at the berth; a fluid conductive loading arm pivotally secured at one end to a side of the pallet structure and connected in fluid conductive relation with said other end of the movable section; connector means on the other end of the loading arm adapted for fluid conductive connection with ship-board fittings; and cable means connected to the loading arm and secured to a buoy at the berth whereby the loading arm may be raised from the pallet structure, upwardly adjacent the ship's side, for connection of said connector means with said fittings, when the pallet is drawn into contact with the ship's hull.

14. In an apparatus for establishing fluid communication with a vessel floating in a body of water, an anchor; means for fixing said anchor in a predetermined position in said body of water; an elongated substantially non-extensible conduit means having inner ad outer end portions; means connecting said inner end portion of the conduit means to said anchor so that said inner end portion is submerged in the water and so that said outer end portion can move elevationally with respect to said anchor and said inner end portion; and means for connecting the outer end portion of the conduit means to the vessel so that said conduit means moors said vessel to said anchor and is thereby under tension between said anchor and said vessel, said outer end portion of the conduit means being in fluid communication with the vessel.

15. The apparatus of claim 14 wherein one of said connecting means connects its respective end portion so that said vessel is movable in a generally circular path about an upstanding axis that is fixed with respect to the vessel.

16. The apparatus of claim 14 wherein said connecting means connects said inner end portion so that said inner end portion is pivotable relative to said anchor about a substantially horizontal axis and rotatable relative to said anchor about an upstanding axis.

17. The apparatus of claim 14 wherein said conduit means is rigid-walled and metallic.

18. In an apparatus for establishing fluid communication with a vessel floating in a body of water, an anchor submerged in the water; means for fixing said anchor in a predetermined position with respect to the bed of the body of water; an elongated conduit means having inner and outer end portions; means connecting said inner end portion of the conduit means to said anchor and at a submerged position so that the outer end portion of the conduit means can move up and down with respect to said anchor and so that said conduit means can rotate about an upstanding axis through the anchor, said connecting means including an upright male member journalled in an upright female member and constituting a swivel joint which establishes said upstanding axis; and means for connecting the outer end portion of the conduit means to the vessel so as to moor said vessel to said anchor by the conduit means and so as to constrain said vessel to move in a generally circular path about said upstanding axis.

19. In an apparatus for transferring fluid to or from a vessel in the water, elongated means for mooring the vessel, said mooring means being submergible in the water in an inclined position and having a lower anchoring end portion and an upper end portion, means for anchoring said anchoring end portion with respect to the vessel, a supporting pallet pivotally connected to the upper end portion of the mooring means, means for connecting said pallet to a vessel so that said vessel is moored by the mooring means, and fluid conducting means borne by said pallet for establishing fluid communication with the vessel.

20. The apparatus of claim 19 wherein said fluid conducting means is an articulated loading arm of rigid tubular sections interconnected by swivel joints and connected to the pallet by a swivel joint.

21. The apparatus of claim 20 wherein said loading arm is movable between a folded position supported by and stored on said pallet and an extended position projecting upward from the pallet.

22. In combination with a vessel floating in water, an apparatus for establishing fluid communication with the vessel comprising elongated inclined conduit means extending under the vessel, means anchoring said conduit means relative to said vessel and in a submerged position in the water, tension means connected to said vessel at a position spaced from said conduit means, a support in closely confronting relation to the vessel, said support being connected to said tension means, means pivotally connecting the support to said conduit means for relative elevational movement between said support and conduit means, and means on said support for establishing fluid communication between said conduit means and said vessel.

23. The apparatus of claim 22 wherein said conduit means is a pipeline assembly including a rigid metal pipeline section and a tubular buoyancy chamber extending lengthwise of and attached to said pipeline section, said assembly interconnecting said anchoring means and said support with the pipeline section being connected to said establishing means.

24. In combination with a vessel, an apparatus for establishing fluid communication with the vessel comprising an anchor fixed with respect to and below the vessel, elongated conduit means having an end portion pivoted to said anchor for up-and-down movement of the conduit means, said conduit means projecting lengthwise of the vessel, a pallet having a first portion pivotally connected to the conduit means and a second portion spaced lengthwise of the vessel from said conduit means, flexible tension means interconnecting said second portion of the pallet and the vessel at a position spaced lengthwise of the vessel from said pallet with said pallet being located between said conduit means and said position, and means borne by said pallet for establishing fluid communication between said conduit and said vessel.

25. In an apparatus for transferring fluid to or from a vessel, an elongated substantially longitudinally and transversely rigid structure having mounting and coupling end portions, means for anchoring said mounting end portion in a submerged position in the water so that said structure can swing up and down with respect to said anchoring means, said structure extending upward from said anchoring means and under the vessel to a position generally midships of the vessel, means for connecting said coupling end portion to said vessel whereby said vessel is moored to said anchoring means by said structure so that said anchoring means, said structure and said connecting means are subjected to and bear the entire pull of the vessel as it attempts to move away from the anchoring means under the influence of wind and wave action, said structure having a flow passage therein, and means for establishing fluid communication between said vessel and said flow passage.

26. A method of transferring fluid to or from a ship at an offshore berth comprising the steps of maneuvering the ship into the berth, establishing a first mooring connection between the ship and the sea bed in order to maintain the ship in the berth, and establishing a second connection between the ship and the sea bed which second connection thereafter bears substantially all of the mooring forces instead of said first connection, conducts fluid to or from the ship, and permits horizontal ranging of the ship about a submerged reference point.

27. The method of claim 26 wherein said steps include maneuvering the ship into the berth and establishing said second connection so that the line of said mooring forces borne by said second connection is oriented substantially lengthwise of the ship.

28. The method of claim 26 including the step of disestablishing said first mooring connection after said second connection is established.

29. In combination with a vessel, an apparatus for establishing fluid communication with the vessel comprising an anchor fixed with respect to and below the vessel, elongated conduit means having an end portion flexibly connected to said anchor for up-and-down movement of the conduit means, a pallet having a first portion flexibly connected to the conduit means and a second portion spaced from said conduit means, flexible tension means inter-connecting said second portion of the pallet and the vessel at a position spaced from said pallet with said pallet being located between said conduit means and said position, and means borne by said pallet for establishing fluid communication between said conduit and said vessel.

References Cited by the Examiner

UNITED STATES PATENTS

| | | | |
|---|---|---|---|
| 2,113,647 | 4/1938 | Davidson et al. | 285—94 |
| 2,648,201 | 8/1953 | Marancik et al. | 137—236 X |
| 2,698,664 | 1/1955 | Freeman | 285—190 X |
| 2,955,626 | 10/1960 | Hartley | 141—279 |
| 3,093,167 | 6/1963 | McCammon | 114—230 X |
| 3,118,155 | 1/1964 | Siegel | 9—8 |
| 3,120,106 | 2/1964 | Foster | 214—14 X |

LAVERNE D. GEIGER, *Primary Examiner.*